(12) United States Patent
Wilkinson (10) Patent No.: US 11,832,590 B2
(45) Date of Patent: Dec. 5, 2023

(54) CATCH

(71) Applicant: Nigel Wilkinson, Newport Gwent (GB)

(72) Inventor: Nigel Wilkinson, Newport Gwent (GB)

( * ) Notice: Subject to any disclaimer, the term of this patent is extended or adjusted under 35 U.S.C. 154(b) by 185 days.

(21) Appl. No.: 16/971,094

(22) PCT Filed: Feb. 20, 2019

(86) PCT No.: PCT/GB2019/050459
§ 371 (c)(1),
(2) Date: Aug. 19, 2020

(87) PCT Pub. No.: WO2019/162663
PCT Pub. Date: Aug. 29, 2019

(65) Prior Publication Data
US 2021/0112780 A1 Apr. 22, 2021

(30) Foreign Application Priority Data

Feb. 20, 2018 (GB) ...................................... 1802745

(51) Int. Cl.
*F16B 45/02* (2006.01)
*A01K 27/00* (2006.01)

(52) U.S. Cl.
CPC .......... *A01K 27/005* (2013.01); *A01K 27/004* (2013.01); *A01K 27/001* (2013.01); *F16B 45/021* (2021.05)

(58) Field of Classification Search
CPC .... A01K 27/005; A01K 27/003; A01K 27/00; A44B 13/02; F16B 45/02
See application file for complete search history.

(56) References Cited

U.S. PATENT DOCUMENTS 370,983 A * 10/1887 Stahl ...................... F16B 45/02
 24/600.1
2,492,991 A * 1/1950 Hanna ................... F16B 45/021
 24/599.6

(Continued)

FOREIGN PATENT DOCUMENTS

DE 8706660 U1 8/1987
DE 10331968 B3 1/2005

(Continued)

*Primary Examiner* — Kristen C Hayes
(74) *Attorney, Agent, or Firm* — Crowe & Dunlevy, P.C.

(57) ABSTRACT

The present invention provides a releasable catch, such as for releasable attachment to a dog collar or the like. In particular, the present invention provides a releasable catch comprising a body having a first elongate portion and a second elongate portion, the first and second elongate portions being engaged with one another at a pivot region and pivotable relative to one another about the pivot region between an open configuration in which the second elongate portion contacts the first elongate portion at a first contact location to define a first closed aperture adjacent the pivot region and a second open aperture distal to the pivot region, and a closed configuration in which the second elongate portion also engages the first elongate portion at a second contact location along its length and close the second aperture distal to the pivot region, and wherein the second elongate member is biased in a direction towards the second contact location so as to bias the catch in the closed configuration. Also provided is a dog lead comprising an elongate flexible portion engaged with such a releasable catch.

19 Claims, 4 Drawing Sheets

(56) References Cited

U.S. PATENT DOCUMENTS

| | | | | |
|---|---|---|---|---|
| 4,621,851 A * | 11/1986 | Bailey, Jr. | ............... | F16B 45/02 |
| | | | | 24/600.1 |
| 4,751,892 A * | 6/1988 | Sechel | ................... | B63B 21/00 |
| | | | | 114/221 R |
| 5,820,181 A * | 10/1998 | Le Noach | ............... | B63B 21/54 |
| | | | | 294/82.19 |
| 6,450,558 B1 | 9/2002 | Ringrose | | |
| 8,327,788 B1 * | 12/2012 | Cardarelli | ............... | B63B 21/54 |
| | | | | 114/221 R |
| 8,443,747 B1 * | 5/2013 | Cardarelli | ............... | B63B 21/04 |
| | | | | 114/221 R |
| D862,209 S * | 10/2019 | Fusi | ....................... | F16B 45/02 |
| | | | | D8/367 |
| 10,458,460 B1 * | 10/2019 | Fox | ....................... | F16B 45/021 |
| 2015/0335104 A1 | 11/2015 | Dickie | | |

FOREIGN PATENT DOCUMENTS

| | | | | |
|---|---|---|---|---|
| DE | 202011105566 U1 | 12/2012 | | |
| EP | 1229258 A2 | 8/2002 | | |
| JP | 2014039774 A | 3/2014 | | |
| JP | 2017144078 A * | 8/2017 | ............. | A62B 35/00 |
| WO | 8903173 A1 | 4/1989 | | |
| WO | 9607830 A1 | 3/1996 | | |
| WO | 2006076769 A1 | 7/2006 | | |

* cited by examiner

CATCH

BACKGROUND TO THE INVENTION

The present invention relates to a releasable catch, such as for releasable attachment to a dog collar or the like.

There are many different types of catches that are used for releasable attachment of, for example, a dog lead to a dog collar. However, these conventional catches are often difficult to operate as they involve the application of force to a very small part of the catch to open it whilst at the same time a user must try and accurately pass the attachment ring of the collar through the narrow opening in the catch. This is even more difficult when dealing with an excitable dog that keeps moving position during this operation. Further, this is, by necessity, a two-handed operation. Even the removal of the lead from the collar is by no means straightforward as often the lead is under tension due to applied force from the attached dog. A user will have to release the tension between the lead and collar before the catch can be opened with one hand and the collar attachment link guided out of the open catch with the other hand. Thus, any objects being carried by a user must be discarded to free both of the user's hands before they can begin to operate the catch.

Further, conventional caches can be difficult to operate when wearing gloves, or if a user has dexterity issues such as arthritis or any disability that prevents normal use of the hands. The operation of conventional catches under such circumstances is difficult due to the precision and often strength required to locate a D or O-ring safely within the catch.

Even poor eyesight can be problematic when operating conventional catches as it can be difficult to see the D or O-ring clearly enough to locate it within the catch.

A further problem with conventional catches is that should they fail, which often happens as a result of constant application of force from an energetic dog, the bias mechanism of the catch will fail, and the collar attachment ring will immediately release. This is particularly dangerous as the dog will then be free to run into potentially dangerous situations without restraint.

There is therefore a need for an improved catch that will not release the collar attachment ring in the event of failure of the catch bias closure mechanism, has a more convenient attachment process, and which can be released using a single-handed operation.

SUMMARY OF THE INVENTION

The present invention seeks to address the problems of the prior art.

Accordingly, a first aspect of the present invention provides a releasable catch comprising a body having a first elongate portion and a second elongate portion, the first and second elongate portions being engaged with one another at a pivot point and pivotable relative to one another about the pivot point between an open configuration in which the second elongate portion contacts the first elongate portion at a first contact location to define a first closed aperture adjacent the pivot point and a second open aperture distal to the pivot point, and a closed configuration in which the second elongate portion also engages the first elongate portion at a second contact location along its length and closes the second aperture distal to the pivot point, and wherein the catch further comprises a first biasing mechanism located adjacent the pivot point and arranged to bias the catch in the closed configuration.

A further aspect of the present invention provides a releasable catch comprising a body having a first elongate portion and a second elongate portion, the first and second elongate portions being engaged with one another at a pivot region and pivotable relative to one another about the pivot region between an open configuration in which the second elongate portion contacts the first elongate portion at a first contact location to define a first closed aperture adjacent the pivot region and a second open aperture distal to the pivot region, and a closed configuration in which the second elongate portion also engages the first elongate portion at a second contact location along its length and close the second aperture distal to the pivot region, and wherein the second elongate member is biased in a direction towards the second contact location so as to bias the catch in the closed configuration.

In one embodiment, the second elongate member comprises a spring steel wire having respective first and second end engagement portions for engagement with corresponding apertures provided in the first elongate member at the pivot region, wherein the first and second end engagement portions are off-set relative to one-another. In such an embodiment, preferably, a portion of the spring steel wire distal to the pivot region extends around a portion of the first elongate member located adjacent the first contact location to provide an engagement portion operable to receive a pull tab.

In an alternative embodiment, the catch further comprises a first biasing mechanism located adjacent the pivot region and arranged to bias the catch in the closed configuration.

The first and second elongate portions may be rigid, or alternatively, the second elongate portion may comprise first and second rigid portions in pivotable engagement with one another.

Thus, when the catch is in the open position, an item, such as the O-ring of a dog collar, can access the open aperture, but is prevented from further entering into the catch as it cannot access the first closed aperture adjacent the pivot region. This results in control over the position of the O-ring within the catch i.e. within the second aperture distal to the pivot region.

Thus, the O-ring is located within the second closed aperture (when the catch is in the closed configuration) rather than being able to move closer to the pivot region within the catch. This means that a quicker release of the O-ring is possible.

Preferably, the second elongate portion extends beyond the first contact location in a direction away from the second contact location to provide an engagement portion operable to receive a pull tab.

More preferably, the catch is provided with a pull tab engaged with the engagement portion.

It is to be appreciated that for the first and second elongate portions to contact one another at both the pivot region and at the first and second contact locations, either or both first and second elongate portions are preferably non-linear.

In one embodiment, the second elongate portion extends into, and preferably through, an aperture in the first elongate portion at the first contact location. This means that the second elongate portion slides in a first direction within the aperture in the first elongate portion when the catch is moved from a closed to an open configuration and slides in a second direction within the aperture when the catch is returned from the open configuration to the closed configuration.

In a further embodiment, the first elongate portion comprises a first end region located adjacent the pivot region and a second end region located distal to the first end.

Preferably, the second end region of the first elongate portion comprises an abutment to prevent pivoting of the second elongate portion beyond the second end region of the first elongate portion. This abutment prevents movement of the second elongate portion beyond the second contact location. Thus, by biasing the catch in the closed direction and preventing the movement of the second elongate portion beyond the second contact location, the catch is retained in the closed configuration and cannot accidentally be opened by application of force to the second elongate portion to open the second aperture by moving the second elongate portion past the second contact location.

Preferably, the first elongate portion comprises a ramp located adjacent the abutment and extending in a direction towards the first contact location. Such a ramp serves to act as a guide to guide an item out of the second aperture as the catch is moved from a closed to an open configuration.

In a further embodiment, the first and second elongate portions define an angle adjacent the pivot region and wherein the angle is increased as the catch is moved from an open configuration to a closed configuration.

Preferably, the second elongate portion extends beyond the first contact location in a direction away from the abutment of the first elongate portion. This provides a hook portion that extends outside of the first and second apertures.

Once grasped, a user can apply force to the second elongate portion to pivot it relative to the first elongate portion to reduce the angle adjacent the pivot region and move the catch from a closed configuration to an open configuration. Further, release of the applied force results in the return movement of the catch from the open to the closed configuration due to biasing of the catch in the closed configuration.

Thus, an O-ring located within the catch can be simply released by a user by grasping the extended end portion of the second elongate portion and pulling it so as to pivot the second elongate portion relative to the first elongate portion, thereby opening the second aperture and immediately releasing the O-ring as the second elongate portion is moved apart from the first elongate portion a sufficient distance to allow the O-ring to pass through the gap that opens up between them.

Preferably, the tab is located distal to the second contact location. Thus, should the first biasing means fail, the catch would still not accidentally open if pressure is applied to the O-ring (for example by a dog pulling on the attached collar) as the O-ring would not be able to apply the pulling force to the tab that would be required to open the aperture within which the O-ring is received when the catch is in the closed configuration.

In a further embodiment, when the catch is in the closed configuration, the abutment of the first elongate portion extends beyond the second contact location in a direction away from the second closed aperture. The portion of the abutment extending beyond the second contact location thereby acts as a guide against which an O-ring can be easily positioned prior to locating the O-ring within the catch.

Thus, to operate the catch, a user grasps the catch in one hand and the O-ring in the other and slides the O-ring against the catch until it abuts the hook and is located adjacent the first contact location. When the catch is in the closed configuration, once the O-ring has been located adjacent the abutment it is therefore also adjacent the second elongate portion (which is located at the second contact location), a user can apply force to the second elongate portion via the O-ring, thereby pivoting the second elongate portion in a direction away from the second contact location and moving the catch from a closed to an open configuration. Once the second elongate portion has pivoted sufficiently to open the second aperture, the O-ring will be guided from the abutment along the first elongate portion and into the second open aperture. As soon as the O-ring moves into the open aperture and past the second elongate portion, the force being applied through the O-ring will no longer be acting on the second elongate portion and the second elongate portion will return to the second contact location under the biasing forces of the catch, thereby returning the catch to the closed configuration and trapping the O-ring within the now-closed second aperture.

Although the preceding paragraph describes the application of force through the O-ring, it is to be appreciated that the force may be applied through the catch to bring it into contact with a stationary O-ring to achieve the same relative movements and result as described above.

Further, it is to be appreciated that the catch can be operated without the user having to grasp the O-ring at all. Provided the user can see or access the O-ring, then the catch can be operated by placing the hook through the O-ring and applying a force in a direction towards the O-ring against the catch bias thereby pivoting the second elongate portion relative to the first elongate portion and opening the catch sufficiently for the O-ring to slide into the second aperture. Releasing the applied force after the O-ring has sufficiently entered the second aperture will result in the biasing mechanism returning the catch to the closed configuration, trapping the O-ring with the catch.

A releasable catch according to the present invention may be further provided with an attachment portion located on the distal side of the pivot region to the abutment of the first elongate portion. The attachment portion may comprise an O-ring, attachment clip such as a karabiner or similar, or a fabric loop such as a leather loop or similar, or any other attachment type suitable to secure the catch to an object such as a dog lead or similar.

The catch may be further provided with a second biasing mechanism located adjacent the first biasing mechanism, the second biasing mechanism arranged to bias the catch in the closed configuration. Thus, should one biasing mechanism fail, the other biasing mechanism will prevent the catch from opening unexpectedly.

Although the examples described herein relate mainly to a catch on a dog lead for connecting to a dog collar or another portion of the lead to form a slip lead, it is to be appreciated that the catch has applications in other fields such as, but not limited to, non-canine animal restraint, skiing, hiking and mountaineering equipment, luggage straps and any other situation where a releasable catch could be used and in particular where single handed release of the catch is desirable.

A further aspect of the present invention provides a dog lead comprising an elongate flexible portion engaged with a releasable catch according to a preceding aspect of the present invention.

Preferably, the elongate flexible portion is provided with a cable extending along at least a portion of the length of the elongate flexible portion, the cable being in mechanical engagement with the second elongate portion.

BRIEF DESCRIPTION OF THE DRAWINGS

An embodiment of the invention will now be described, by way of example only, and with reference to the accompanying drawings, in which.

DETAILED DESCRIPTION OF THE INVENTION

For the purposes of clarity, the same figure references have been used to indicate similar features of each embodiment.

Figure 1:
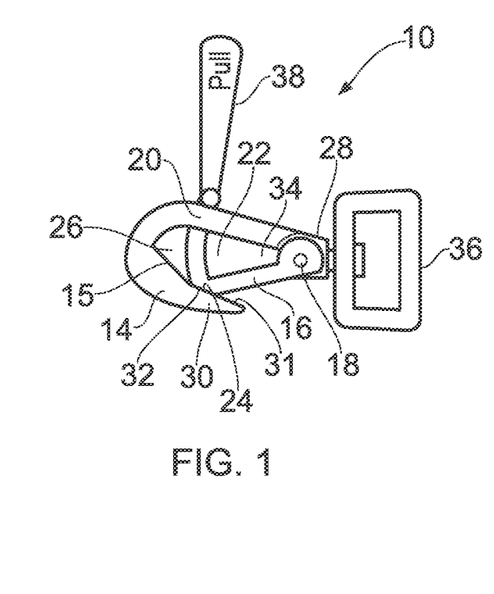
FIG. 1 is a side view of a first embodiment of a catch in accordance with the present invention in a closed configuration.
Figure 2:
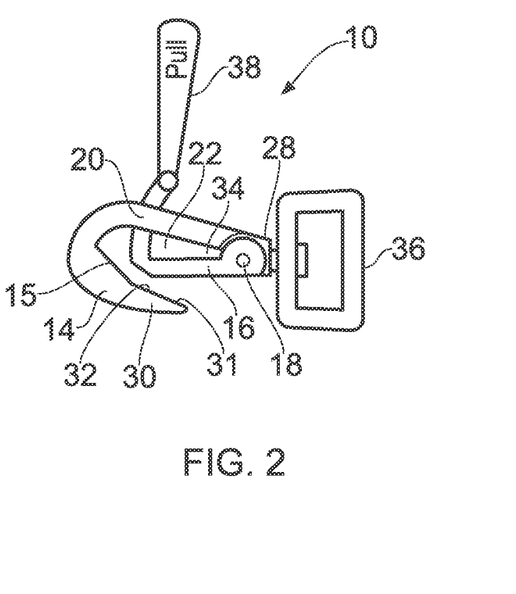
FIG. 2 is a side view of the catch of FIG. 1 in an open configuration.
Figure 3:
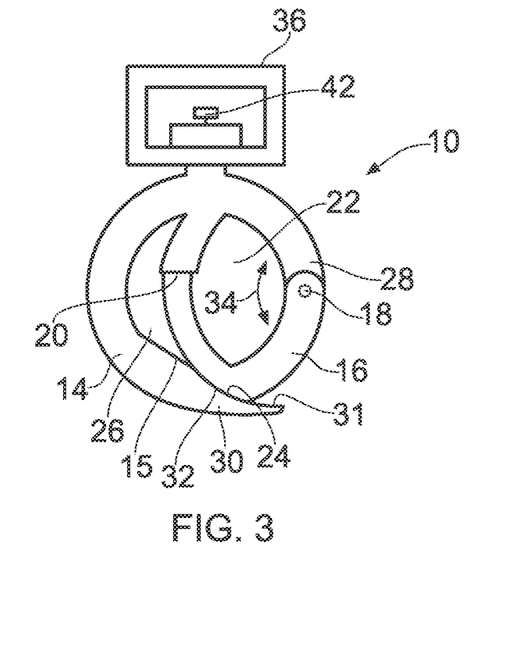
FIG. 3 is a side view of a second embodiment of a catch in accordance with the present invention in a closed configuration.
Figure 4:
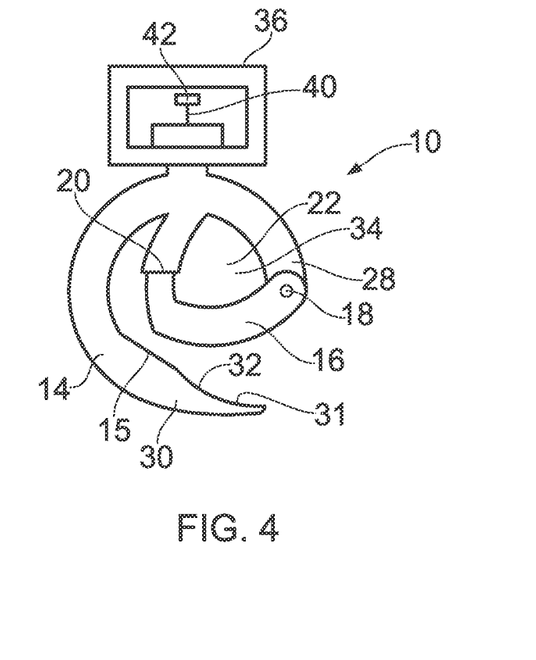
FIG. 4 is a side view of the catch of FIG. 3 in an open configuration.
Figure 5:
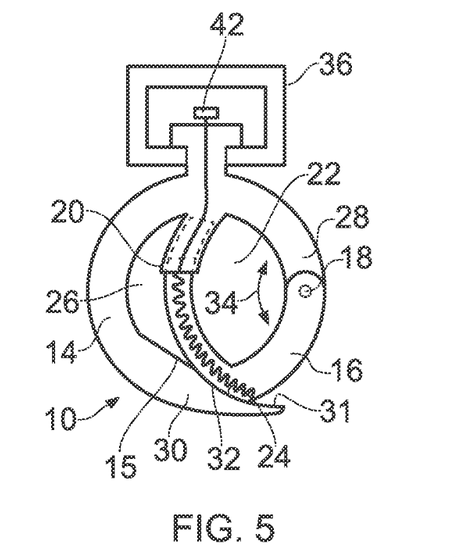
FIG. 5 is a cross-sectional view of the catch of FIG. 3 in the closed configuration.
Figure 6:
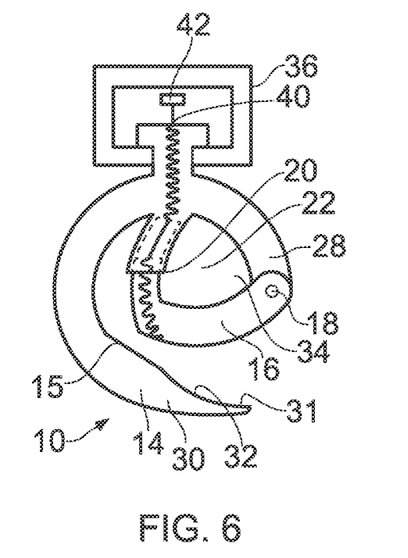
FIG. 6 is a cross-sectional view of the catch of FIG. 4 in the open configuration.

FIGS. 1 and 2 show a catch in accordance with a first embodiment of the present invention. Catch 10 comprises a body having a first elongate portion 14 and a second elongate portion 16. First and second elongate portions 14, 16 are engaged with one another at a pivot region 18 and are pivotable relative to one another about pivot region 18 between an open configuration (see FIG. 2) in which the second elongate portion 16 contacts the first elongate portion 14 at a first contact location 20 to define a first closed aperture 22 adjacent the pivot region 18, and a closed configuration (see FIG. 1) in which the second elongate portion 16 also engages the first elongate portion 14 at a second contact location 24 along its length to define a second closed aperture 26 distal to the pivot region 18, and wherein the catch 10 is biased in the closed configuration.

The first elongate portion 14 comprises a first end region 28 located adjacent the pivot region 18 and a second end region 30 located distal to the first end region 28. The second end region 30 of the first elongate portion 14 further comprises an abutment 32 to prevent the second elongate portion 16 pivoting beyond the second end region 30 of the first elongate portion 14.

Second end region 30 is elongate to provide a projecting hook 31 that can be engaged by an O-ring during use, for example the O-ring of a dog lead or similar.

The first elongate portion 14 may further comprise a ramp 15 located adjacent abutment 32 and extending in a direction towards first contact location 20. Ramp 15 acts as a guiding surface to facilitate removal of an O-ring or the like from the second aperture when the catch is moved from a closed to an open configuration.

The first and second elongate portions 14, 16 define an angle 34 adjacent the pivot region 18. This angle 34 increases as the catch 10 is moved between an open configuration and a closed configuration.

The second elongate portion 16 extends beyond the first contact location 20 in a direction away from the abutment 32 of the first elongate portion 14 to provide a securing point for a pull tab 38.

As can be seen in FIG. 1, when the catch 10 is in the closed configuration, the abutment 32 of the first elongate portion 14 extends beyond the second contact location 24 in a direction away from the second closed aperture 26.

A connecting ring 36 is located on the distal side of the pivot region 18 to the abutment 32 of the first elongate portion 14.

In use, a user would slide hook 31 into position adjacent an O-ring such that the O-ring is located in the space defined between abutment 32 adjacent second contact location 24. Once the O-ring is in place, force is applied to second elongate portion 16 via the O-ring to cause second elongate portion 16 to pivot about pivot region 18 until first and second elongate portions 14, 16 have pivoted apart sufficiently that the O-ring can pass between them and into aperture 26. As soon as the O-ring has passed into aperture 26, force will no longer be applied to second elongate portion 16 via the O-ring and second rigid portion 16 will then pivot relative to first elongate portion 14 under bias to contact first elongate portion 14 at second contact location 24, thereby reclosing aperture 26, retaining the O-ring within catch 10.

To release the O-ring from catch 10, a user would grasp tab 38 and apply a pulling force to tab 38 to pivot second elongate portion 16 about pivot region 18, thereby pulling second rigid portion 16 away from second contact location 24 and opening aperture 26. As the O-ring cannot move beyond the second elongate portion 16 towards pivot region 18, the O-ring is retained in aperture 26 such that it will easily slide out of aperture 26 when aperture 26 is so opened. Thus, the release of the O-ring from catch 10 is a simply one-handed operation, requiring a user to simply grasp and pull tab 38. On release of tab 38, second elongate portion 16 will pivot back to recontact first elongate portion at second contact location 24, thereby reclosing aperture 26.

FIGS. 3 to 9 show a second embodiment of the present invention which operates in a similar manner to the first embodiment, but can be operated remotely by a user from the handle of an attached lead. However, the tab 38 of the first embodiment is replaced with a cable 40 and cable tab 42 connected to second elongate portion 16. Catch 10 is operated by pulling cable tab 42 upwards, thereby pivoting attached second elongate portion 16 relative to first elongate portion 14 and opening aperture 26. Release of cable tab 42 will result in second elongate portion 16 pivoting under bias to close aperture 26, thereby returning catch 10 to a closed configuration. The upper portion of connecting ring 36 acts as an anchor point for a lead and also serves to prevent cable tab 42 being accidentally pulled and also acts to prevent over-pulling of cable tab 42. Cable tab 42 comprises a universal joint to prevent the rotation of cable 40 during use.

Figures 7, 8, 9:
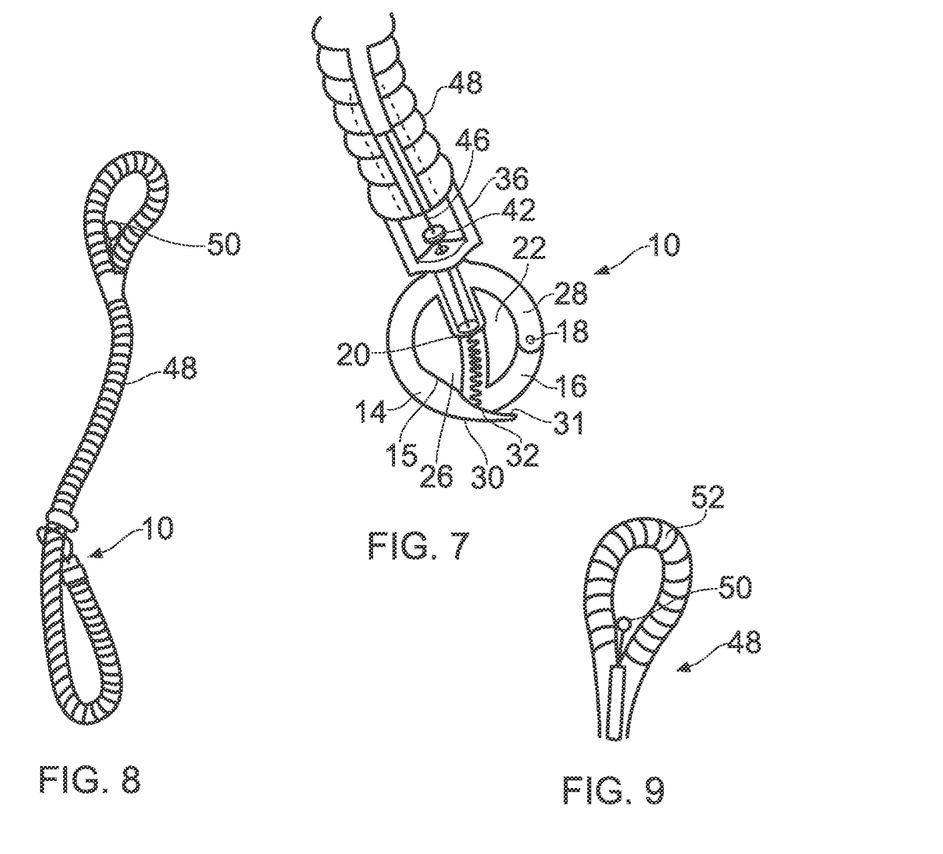
FIG. 7 is a perspective view of the catch of FIG. 3 in a closed configuration with a lead attached.
FIG. 8 is a perspective view of the catch and lead of FIG. 7 and also showing the lead handle for remote operation of the catch.
FIG. 9 is a perspective view of the handle of the lead of FIG. 8.
Figure 10:
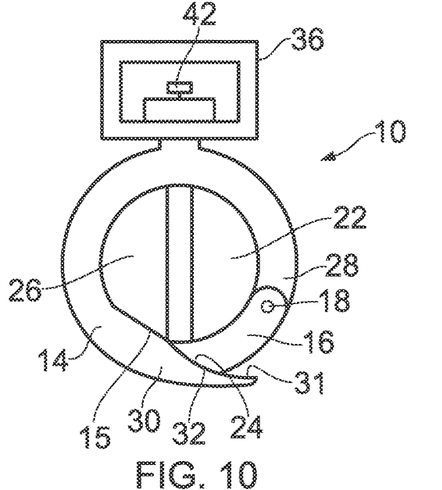
FIG. 10 is a side view of a third embodiment of a catch in accordance with the present invention in a closed configuration.
Figure 11:
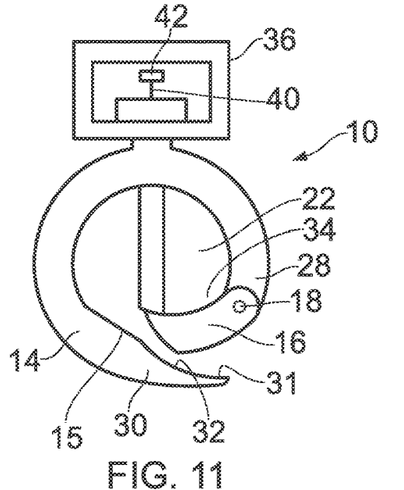
FIG. 11 is a side view of the catch of FIG. 10 in the open configuration.

FIG. 7 shows the catch 10 of FIGS. 3 to 6 attached to a lead 48. Cable tab 42 is connected to a cable 46 running the length of attached lead 48 (partially shown). The cable runs to the handle of the lead (not shown) where it can be pulled to apply upward force to cable tab 42 to operate catch 10 and open aperture 26

The catch 10 and lead 48 of FIG. 7 is intended for use as an integral collar and lead arrangement, as shown in FIGS. 8 and 9. However, it is to be appreciated that the catch 10 and lead 48 arrangement of FIG. 7 may also be used as a normal lead with the catch attached to a conventional O-ring located on a collar or harness. Thus, the embodiment of FIG. 7 may be used as either a slip lead or as a conventional lead for collar/harness attachment.

Lead 48 is retained within aperture 26 of catch 10. This provides the additional advantage that, when used as a slip lead, the collar will automatically adjust to the correct length when placed around the neck of a dog. The collar and lead arrangement can be removed as previously described in relation to FIG. 7, by a user simply pulling on release loop 50 provided at the end of cable 46 in the handle loop 52 of lead 48.

The provision of a release loop 50 in the handle loop 52 of lead 48 allows a user to release catch 10 without having to bend down or restrain an energetic dog before removing the lead. It is also a useful emergency release when urgent release of the dog is required, for example, when a dog is putting the owner in danger by excessively pulling on the lead or where the dog is being attacked and the restraint of the dog prevents it defending itself or escaping from the situation. Further, in the case of police dogs or gun dogs used for hunting, it is important that the dogs can be released quickly when required.

FIGS. 10 to 13 show a further embodiment of a catch in accordance with the present invention, operable in a similar manner to that previously described.

Figure 12:
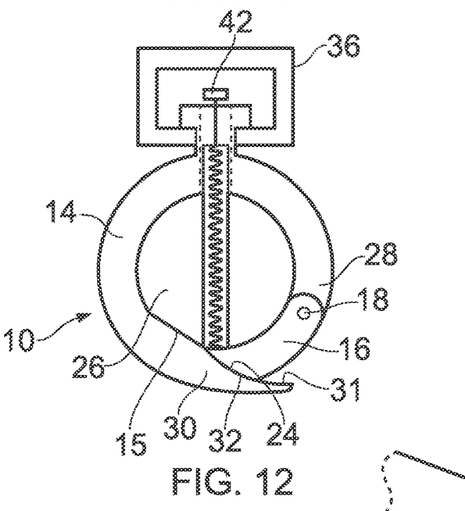
FIG. 12 is a cross-sectional view of the catch of FIG. 10 in a closed configuration of FIG. 10.
Figure 13:
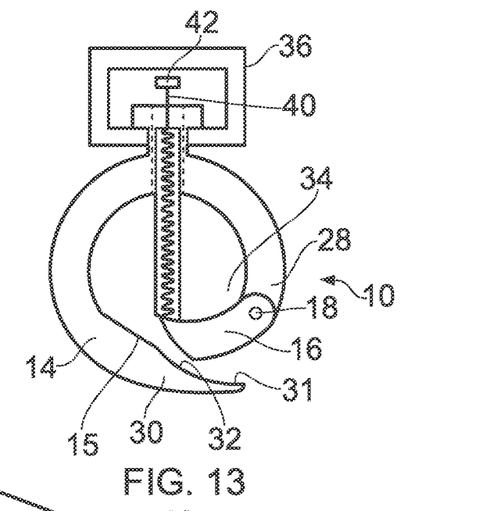
FIG. 13 is a cross-sectional view of the catch of FIG. 10 in the open configuration.

The catch 10 of FIGS. 12 and 13 shows catch 10 provided with a cable 40 and cable tab 42 and is operated in a similar manner to that previously described.

It is to be appreciated that the second elongate portion may comprise a single piece or rigid arrangement, such as shown in FIGS. 1 and 2, or may comprise a multi-part arrangement such as shown in FIGS. 10 to 13, where the second elongate portion comprises two rigid parts pivotable relative to one another.

Figure 14:
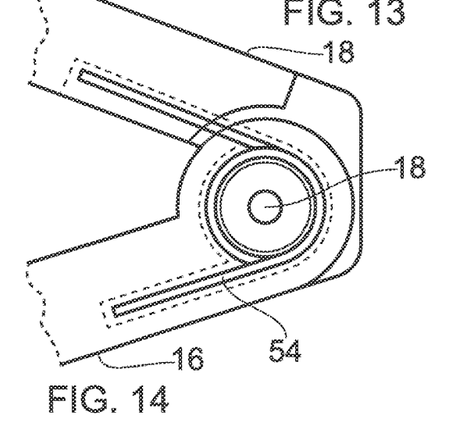
FIG. 14 is a cross-sectional view of a biasing mechanism of a catch in accordance with the present invention.

Finally, FIG. 14 is a partial cross-sectional view showing the pivot region 18 and biasing mechanism 54 which takes the form of a conventional biasing spring arrangement wrapped around the pivot region. This biasing means may be used in embodiment of the present invention. However, it is to be appreciated that any suitable biasing mechanism know to the skilled person and suitable to achieve the same effect may be used in addition to, or as an alternative to, that shown in FIG. 14.

Figure 15:
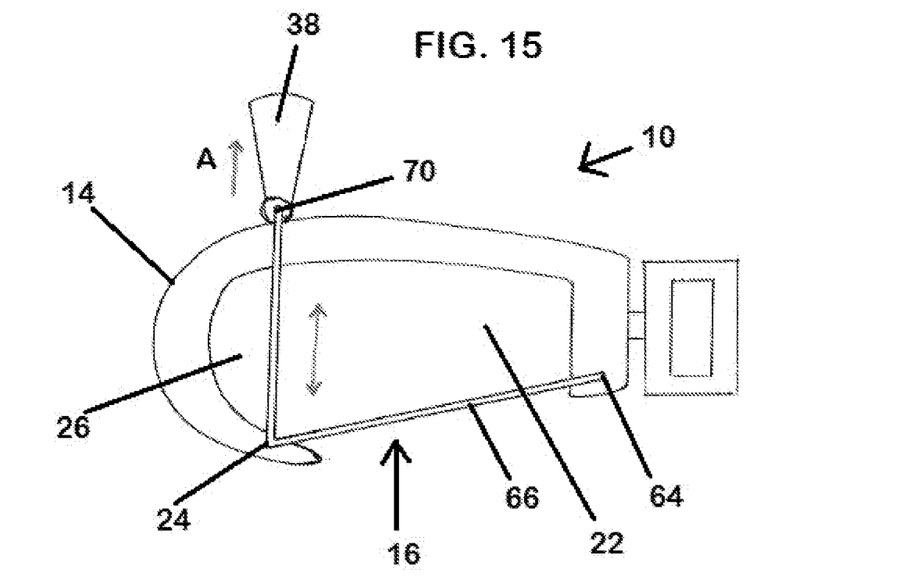
FIG. 15 is a cross-sectional view of a fourth embodiment of a catch in accordance with the present invention in a closed configuration.

FIG. 15 shows a catch in accordance with a fourth embodiment of the present invention. Catch 10 comprises a body having a first elongate portion 14 and a second elongate portion 16.

Figure 16:
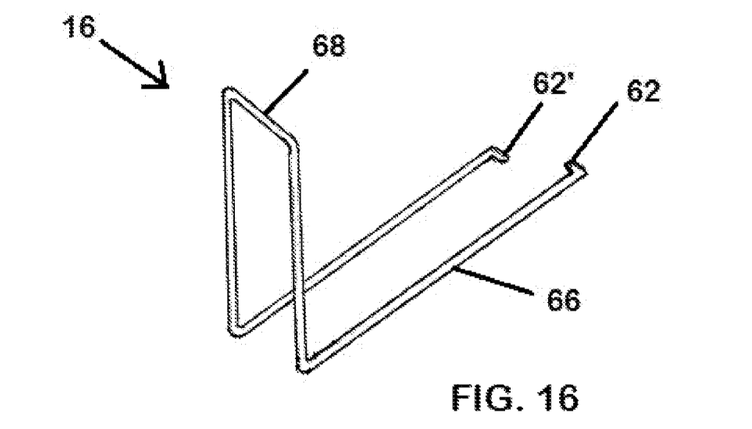
FIG. 16 is a perspective view of the spring jaw of the catch of FIG. 15.

Second elongate portion 16 comprises a spring wire and is shown in more detail in FIG. 16. Each end of second elongate portion 16 is provided with a short end portion 62, 62' arranged perpendicular to adjacent portions 66, 66' of second elongate portion 16. When assembled, the short end portions 62, 62' are received within suitably dimensioned drill holes 64 in first elongate portion 14. The portion 68 of second elongate portion 16 i.e. distal to short end portions 62, 62', extends around first elongate portion 14 and is engaged with a pull tab 38, as shown in FIG. 16. Any suitable pull tab arranged maybe used to engage the pull tab 38 with portion 68 of second elongate portion 16. In the embodiment shown in FIG. 15, pull tab 38 is provided with a through hole 70 dimensioned to receive portion 68 of second elongate portion 16 therethrough.

It is to be noted that portion 66 of second elongate portion 16 has a greater length than that of portion 66' and the respective drill holes 64 in first elongate portion 14 are off-set from one another. In this way, when the catch is assembled, first elongate portion 16 provides a spring effect that biases first elongate portion 16 in the closed configuration shown in FIG. 15.

First and second elongate portions 14, 16 are engaged with one another at a pivot point 18 and, in use, short end portions 62, 62' are free to rotate within the respective drill holes 64 in first elongate portion 14. Relative movement between the first and second elongate portions 14, 16 allows the catch 10 to be moved between an open configuration in which the second elongate portion 16 and the first elongate portion 14 are arranged so as to define a single closed aperture 22 adjacent the pivot point 18, and a closed configuration (see FIG. 15) in which the second elongate portion 16 also engages the first elongate portion 14 at a second contact location 24 along its length to define a second closed aperture 26 distal to the pivot point 18, and wherein the catch 10 is biased in the closed configuration.

It is to be appreciated that, as the second elongate portion is biased in the closed configuration, a user would have to apply an upward force to second elongate portion 16 via pull tab 38 in order to flex second elongate portion 16 sufficiently to bring catch 10 into an open configuration. Release of the applied force on pull tag 38 would result in second elongate portion 16 returning to its original shape thus biasing the catch 10 in the closed configuration.

Thus, in use, a user would apply force to pull tag 18 in an upward direction (as shown by arrow A in FIG. 15) to pull the second elongate portion upwards relative to the first elongate member 14, thereby opening aperture 26 sufficiently to allow an O-ring to be inserted into the aperture 26 around first elongate member 14. After the O-ring has been inserted into aperture 26 past second contact location 24, the user can stop the application of force to pull tag 38 thus returning second elongate member 16 to its original shape and returning second elongate member into contact with first elongate member 14 at second contact location 24 and closing aperture 26, retaining the O-ring within the catch 10. The O-ring will then be safely retained within closed aperture 26 until the user once again applied upward force through pull tag 38 to repeat the process of opening catch 10. Until such time as this occurs, catch 10 will remain in the closed configuration due to the biasing of second elongate member 16 keeping second elongate member 16 in contact with first elongate member 14 at second contact location 24.

Although aspects of the invention have been described with reference to the embodiments shown in the accompanying drawings, it is to be understood that the invention is not limited to the precise embodiment shown and that various changes and modifications may be effected without further inventive skill and effort.

The invention claimed is:

1. A releasable catch comprising a body having a first elongate portion and a second elongate portion, the first and second elongate portions being engaged with one another at a pivot region and pivotable relative to one another about the pivot region between an open configuration in which the second elongate portion contacts the first elongate portion at a first contact location to define a first closed aperture adjacent the pivot region and a second open aperture distal to the pivot region, and a closed configuration in which the second elongate portion engages the first elongate portion at both the first contact location and a second contact location along a length of the first elongate portion and close the second aperture distal to the pivot region, and wherein the second elongate member is biased in a direction towards the second contact location so as to bias the catch in the closed configuration,
  wherein the first elongate portion has a length defined by a first terminal end, a second terminal end, and a medial location along the length between the first terminal end and the second terminal end, and wherein the second contact location is at the first terminal end and the first contact location is at the medial location.

2. A releasable catch according to claim 1, wherein the second elongate member comprises a spring steel wire having respective first and second end engagement portions for engagement with corresponding apertures provided in the first elongate member at the pivot region, wherein the first and second end engagement portions are off-set relative to one-another.

3. A releasable catch according to claim 2, wherein a portion of the spring steel wire distal to the pivot region extends around a portion of the first elongate member located adjacent the first contact location to provide an engagement portion operable to receive a pull tab.

4. A releasable catch according to claim 1, wherein the catch further comprises a first biasing mechanism located adjacent the pivot region and arranged to bias the catch in the closed configuration.

5. A releasable catch according to claim 1, wherein the second elongate portion extends beyond the first contact location in a direction away from the second contact location to provide an engagement portion operable to receive a pull tab.

6. A releasable catch according to claim 5, further provided with a pull tab engaged with the engagement portion.

7. A releasable catch according to claim 1, wherein either or both of the first and second elongate portions are non-linear.

8. A releasable catch according to claim 1, wherein the first elongate portion comprises a first end region located adjacent the pivot region and a second end region located distal to the first end region.

9. A releasable catch according to claim 8, wherein the second end region of the first elongate portion comprises an abutment to prevent pivoting of the second elongate portion beyond the second end region of the first elongate portion.

10. A releasable catch according to claim 9, wherein the first elongate portion 14 may further comprise a ramp located adjacent the abutment and extending in a direction towards the first contact location.

11. A releasable catch according to claim 9, wherein the second elongate portion extends beyond the first contact location in a direction away from the abutment of the first elongate portion.

12. A releasable catch according to claim 9, wherein in the closed configuration, the abutment of the first elongate portion extends beyond the second contact location in a direction away from the second closed aperture.

13. A releasable catch according to claim 9, wherein the abutment extends beyond the second contact location to form a projecting hook member.

14. A releasable catch according to claim 9, further provided with an attachment portion located on the distal side of the pivot region to the abutment of the first elongate portion.

15. A releasable catch according to claim 1, wherein the first and second elongate portions define an angle adjacent the pivot region and wherein the angle is increased as the catch is moved from an open configuration and a closed configuration.

16. A dog lead comprising an elongate flexible portion engaged with a releasable catch comprising: a body having a first elongate portion and a second elongate portion, the first and second elongate portions being engaged with one another at a pivot region and pivotable relative to one another about the pivot region between an open configuration in which the second elongate portion contacts the first elongate portion at a first contact location to define a first closed aperture adjacent the pivot region and a second open aperture distal to the pivot region, and a closed configuration in which the second elongate portion engages the first elongate portion at both the first contact location and a second contact location along a length of the first elongate portion and close the second aperture distal to the pivot region, and wherein the second elongate member is biased in a direction towards the second contact location so as to bias the catch in the closed configuration; wherein the elongate flexible portion is provided with a cable extending along at least a portion of the length of the elongate flexible portion, the cable being in mechanical engagement with the second elongate portion.

17. A releasable catch comprising a body having a first elongate portion and a second elongate portion, the first and second elongate portions being engaged with one another at a pivot region and pivotable relative to one another about the pivot region between an open configuration in which the second elongate portion contacts the first elongate portion at a first contact location to define a first closed aperture adjacent the pivot region and a second open aperture distal to the pivot region, and a closed configuration in which the second elongate portion engages the first elongate portion at a second contact location along a length of the first elongate portion and close the second aperture distal to the pivot region, and wherein the second elongate member is biased in a direction towards the second contact location so as to bias the catch in the closed configuration,
  wherein the second elongate member comprises a spring steel wire having respective first and second end engagement portions for engagement with corresponding apertures provided in the first elongate member at the pivot region, wherein the first and second end engagement portions are off-set relative to one-another.

18. A releasable catch according to claim 17, wherein a portion of the spring steel wire distal to the pivot region extends around a portion of the first elongate member located adjacent the first contact location to provide an engagement portion operable to receive a pull tab.

19. A releasable catch comprising a body having a first elongate portion and a second elongate portion, the first and second elongate portions being engaged with one another at a pivot region and pivotable relative to one another about the pivot region between an open configuration in which the second elongate portion contacts the first elongate portion at a first contact location to define a first closed aperture adjacent the pivot region and a second open aperture distal to the pivot region, and a closed configuration in which the second elongate portion engages the first elongate portion at a second contact location along a length of the first elongate portion and close the second aperture distal to the pivot region, and wherein the second elongate member is biased in a direction towards the second contact location so as to bias the catch in the closed configuration, wherein the catch further comprises a first biasing mechanism located adjacent the pivot region and arranged to bias the catch in the closed configuration.

\* \* \* \* \*